(12) United States Patent
King et al.

(10) Patent No.: US 12,153,683 B2
(45) Date of Patent: Nov. 26, 2024

(54) AUTOMATED CONDITIONAL UPDATE

(71) Applicant: Red Hat, Inc., Raleigh, NC (US)

(72) Inventors: William Trevor King, Olympia, WA (US); Douglas Richard Hellmann, Atlanta, GA (US); Scott C. Dodson, Raleigh, NC (US); Benjamin Michael Parees, Raleigh, NC (US); Lalatendu Shishusankar Mohanty, Boston, MA (US); Vadim Pavlovich Rutkovsky, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 149 days.

(21) Appl. No.: 17/752,063

(22) Filed: May 24, 2022

(65) Prior Publication Data

US 2023/0385421 A1   Nov. 30, 2023

(51) Int. Cl.
*G06F 15/16* (2006.01)
*G06F 8/65* (2018.01)
*G06F 21/57* (2013.01)
*G06N 20/00* (2019.01)

(52) U.S. Cl.
CPC ............. *G06F 21/577* (2013.01); *G06F 8/65* (2013.01); *G06N 20/00* (2019.01)

(58) Field of Classification Search
CPC .......... G06F 21/577; G06F 8/65; G06N 20/00
See application file for complete search history.

(56) References Cited

U.S. PATENT DOCUMENTS

| | | | |
|---|---|---|---|
| 8,707,292 B2 | 4/2014 | Little et al. | |
| 8,918,774 B2 | 12/2014 | Hansmann et al. | |
| 9,639,341 B2 | 5/2017 | Freiter et al. | |
| 10,489,138 B1 | 11/2019 | Wu et al. | |
| 11,029,938 B1 | 6/2021 | Sethi et al. | |
| 11,038,784 B2 | 6/2021 | Nickolov et al. | |
| 11,080,619 B2 * | 8/2021 | Vasseur | G06N 20/00 |
| 2021/0055995 A1 * | 2/2021 | Biernacki | G06N 20/00 |
| 2021/0157562 A1 * | 5/2021 | Sethi | G06F 8/65 |
| 2021/0221247 A1 * | 7/2021 | Daniel | H02J 3/008 |
| 2022/0271854 A1 * | 8/2022 | Maruyama | H04L 67/125 |
| 2022/0277232 A1 * | 9/2022 | Jones | G06N 20/00 |

FOREIGN PATENT DOCUMENTS

CN          107908790          4/2018

* cited by examiner

*Primary Examiner* — Richard G Keehn
(74) *Attorney, Agent, or Firm* — Womble Bond Dickinson (US) LLP (57) ABSTRACT

Processing logic may obtain health data from each of a plurality of clients. The health data includes attributes of a respective one of the plurality of clients, a health status of the respective one of the plurality of clients, and a software version of the respective one of the plurality of clients. Processing logic may determine a conditional risk that is associated with at least one of the attributes and the software version, in view of the health data, and store the conditional risk in memory. Processing logic can make the conditional risk, which includes the attributes and the software version, available to a client.

20 Claims, 6 Drawing Sheets

AUTOMATED CONDITIONAL UPDATE

TECHNICAL FIELD

Aspects of the present disclosure relate to software updates, and more particularly, to determining a conditional risk that may be associated with a software version.

BACKGROUND

Computing devices may execute instructions that are grouped together as a computer program to perform one or more related actions. Computing devices may be communicatively coupled to each other over a network, which may include electrical or optical wiring, wireless radio-frequency transceivers, or other network infrastructure. The computing devices may communicate with each other over the network, using a variety of communication protocols.

Developers may update existing software for a variety of reasons such as, for example, to add new functionality, address security concerns, fix bugs, or a combination thereof. Developers may assign a version number to software (e.g., an application or suite of applications), to keep a history of changes to the software. When a device updates its software, the version number of the software may be incremented to indicate the new version of the software that has been installed on the device.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A client may include one or more applications, virtual machines, services, or a combination thereof, that reside on one or more computing devices. The client may seek to update its software from its current version to a newer version. In some cases, multiple software versions may be available for the client to download and install. Each client may have a unique set of attributes that may differ from one client to another. Further, clients may have known adverse reactions to a given software version. In some cases, a client may have attributes (e.g., hardware or software attributes) that may make the client incompatible with a given software version.

For example, one client may be hosted across a large number of nodes on a cloud platform X. A second client may be hosted on a different cloud platform Y, across a much smaller number of nodes. The clients may have different operating systems, different software versions, different CPU architectures, or other different attributes. Data may indicate that clients with platform X may be predisposed to react negatively to software update to version 1.0.1, while a client on cloud platform Y does not have a negative response to the same software update.

In conventional systems, when a client experiences problems (e.g., an error state, garbling data, dropping packets, being unresponsive, or otherwise behaving unpredictably or unexpectedly), an administrator may look into error logs of the client. Further, an administrator may look at various different error logs of the many clients, to try to determine a pattern among the clients. Given the vast number of different attributes that a client may have, and a large number of clients with different software versions, it may be difficult for an administrator to manually sift through vast numbers of error logs of each client to assess what may be causing the problem with the client. Further, it may be inefficient or impracticable for the administrator to assess the vast number of attributes across various clients to determine whether incompatibilities exist between an attribute (or a combination of attributes) and a given software version. As such, conventional systems may not properly determine and provide conditional risks to a client which may be used by the client to decide whether or not to upgrade to a given software version.

Aspects of the disclosure address the above-noted issues and other deficiencies by processing logic that may obtain health data from a plurality of clients. The health data from each client may include a health status indicating that the client is running as expected, an error, or other health indication. The health data may also include various attributes of the client. Processing logic may process the health data from the clients to determine whether one or more of the attributes is linked to a negative reaction. If such a link is found to be present, processing logic may generate and store this as a conditional risk which may be made available to a client so that the client may determine which updates are suitable. Processing logic may automatically (e.g., without input from a human) perform operations such as obtaining and processing of the health data, and determining the conditional risks.

In such a manner, processing logic may analyze fleet data to identify clients that have recently upgraded to a new version and are failing. From the set of failing clients in telemetry, processing logic may automatically identify attributes in those clients to help determine what is unique to those clients that are failing. Processing logic may identify the unique common attributes (or combination of attributes) to define new conditional risks that may be associated with a given software version or upgrade to that version. Such conditional risks may indicate an incompatibility of one or more attributes to a given software version (or update to that software version). The conditional risks may be stored and made accessible to a client so that the client may assess the risk and choose a different software upgrade path. Conditional risks may be stored as a graph or other data structure and updated in view of new health data.

Further, processing logic may, in some examples, apply a machine learning algorithm to health data, to analyze and then identify errors which have some commonalities across multiple clients. A machine learning algorithm may include a deep learning algorithm, an artificial neural network (ANN) such as a deep neural network (DNN), or other artificial intelligence.

Processing logic may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. Processing logic may perform server-side operations of a recommendation service or client-side operations of selecting and performing a software update, or both.

Figure 1:
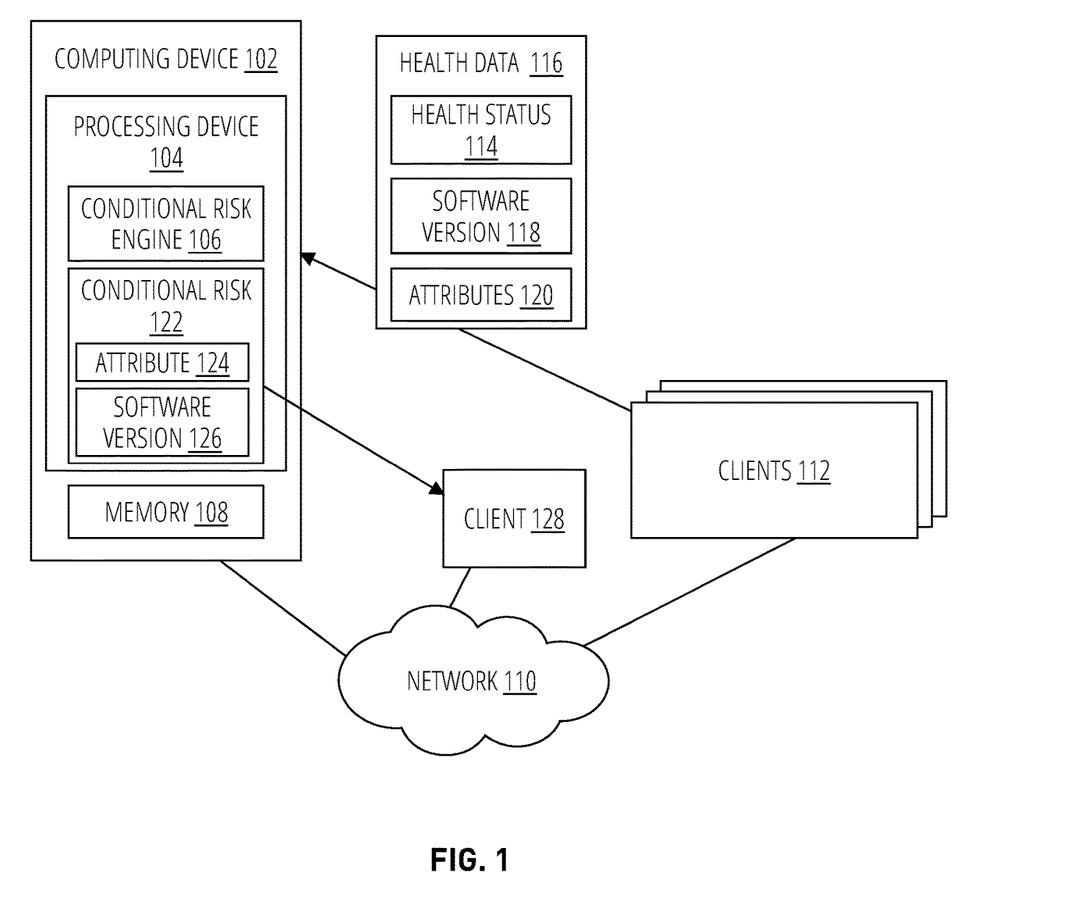
FIG. 1 shows a block diagram of an example computing device that may generate conditional risks that may be associated with a software version, in accordance with some embodiments.

FIG. 1 shows a block diagram of an example computing device that may generate conditional risks associated with a software version, in accordance with some embodiments. Computing device 102 includes a processing device 104 and a memory 108. Memory 108 may include volatile memory devices (e.g., random access memory (RAM)), non-volatile memory devices (e.g., flash memory) and/or other types of memory devices. Computing device 102 may include processing logic such as processing device 104.

Processing device 104 includes a conditional risk engine 106. The conditional risk engine 106 may comprise one or more computer applications that run on processing device 104 to perform operations described herein.

The processing device 104 may obtain health data 116 from each of a plurality of clients 112, the health data 116 may include attributes 120 of a respective one of the plurality of clients 112, a health status 114 of the respective one of the plurality of clients, and a software version 118 of the respective one of the plurality of clients. In some aspects, attributes 120 may be defined (e.g., by an administrator). Each client 112 may send the same list of attributes or have its own pre-defined list of attributes to share with the processing device 104.

Processing device 104 may determine a conditional risk 122 that is associated with at least one of the attributes 120 and the software version 118, in view of the health data 116. Processing device 104 may store the conditional risk 122 in memory 108. The conditional risk 122 may be provided to a client 128 with at least one of the attributes 124 and the software version 126. At least one attribute 124 is one of the attributes 120, and software version 126 is from one of the software versions 118 from the health data.

Each respective one of clients 112 may automatically gather health data 116 for itself, and sends this health data 116 to processing device 104 over network 110. Health status 114 may indicate that the respective client is running normally (e.g., OK) or that one or more error conditions are present on that client. Processing device 104 may process the health data 116 individually and as a whole, to identify relationships between attributes 120 of the clients 112, the health status 114 each client, and the software version 118. As such, processing device 104 may identify one or more incompatibilities between an attribute (or combination of attributes) and a software version.

For example, processing device 104 may process health data from 100 clients and identify that 75 of those clients have a negative health status (e.g., has one or more error conditions). Of those unhealthy clients, processing device 104 may identify that 50 of those unhealthy clients recently upgraded to software version 1.1.0 and 49 of them have a CPU architecture N. Processing device may generate a conditional risk 122 with attribute 124 of CPU architecture N and software version 126 being '1.1.0'. Processing device 104 may send this conditional risk 122 to a client 128 that wishes to upgrade its software. Client 128 may check its own attributes in view of the conditional risk, to inform its decision as to what software version to update to. For example, the client 128 may assess whether software version '1.1.0' a valid software update path for itself, and if so, determine whether client 128 has CPU architecture N. If the client does have CPU architecture N and software version '1.1.0' is a valid software path, then the client may choose a different software version to update to, or ignore the conditional risk and update to software version '1.1.0'.

Client 128 may be separate from clients 112 or one of clients 112. For example, client 128 may share its own health data with processing device 104, and also receive conditional risk 122 from processing device 104. In another example, client 128 may be configured to keep its information private and not share health data with processing device 104. Client 128 may still access conditional risk 122, however, and use this to determine its own software update path. As such, clients with higher security measures may keep sensitive information private, but still leverage health information shared by other clients to navigate around conditional risks associated with software upgrades.

In some examples, the conditional risk 122 may be associated with a combination (e.g., two or more) of the attributes. For example, processing device 104 may process health data from 300 clients and identify that 80 of those clients have a negative health status (e.g., has one or more error conditions). Of those unhealthy clients, processing device 104 may identify that 75 of those unhealthy clients recently upgraded to software version '1.1.3' and 73 of them have a CPU architecture N and less than 'y' number of nodes and are hosted on platform provider G. Processing device may generate a conditional risk 122 with a combination of attributes 124 that includes CPU architecture N, platform provider G, less than 'y' number of nodes, and software version 126 being '1.1.3'. As such, the processing device may identify a combination of attributes which serves as a fingerprint, as being incompatible with a given software version.

In some examples, the processing device 104 may apply a machine learning algorithm to the health data to identify correlations between one or more attributes and a given software version. The machine learning algorithm may include a machine learning model that is trained with supervised or unsupervised learning.

Under supervised learning, training data may be labeled and used to train a model to process the health data. For example, using regression (a supervised learning technique) the machine learning model may determine relationships between attributes and software versions. Supervised learning may use the health status (e.g., OK, error, etc.) as a label for the training data.

Unsupervised learning may train a machine learning algorithm to analyze and cluster unlabeled data sets. These algorithms may discover patterns in data without a labeled training dataset. Such machine learning algorithms may be used for clustering data or determining associations (e.g., between one or more attributes and a software version). The machine learning model may group unlabeled data (e.g., health data) based on their similarities or differences. A machine learning algorithm may include a K-means clustering algorithm or an association based machine learning algorithm that uses different rules (e.g., error rates, error thresholds, etc.) to find relationships between variables (e.g., client attribute and software versions) in a given dataset.

As described, a machine learning algorithm may include an ANN such as a DNN. Other machine learning algorithms and training techniques may be applied to health data without departing from the scope of the present disclosure. As such, a machine learning algorithm (e.g., a trained machine learning model) may take the health data as input and group one or more attributes with a software version where there is a pattern of failure. In response to identifying such correlations between one or more of the attributes and the software version, the processing device 104 may generate the conditional risk 122 with the attribute (or set of attributes) and the software version.

In some examples, processing device 104 may determine the conditional risk 122 by comparing the health data against one or more conditions. In response to the one or more conditions being present in the health data, processing device 104 may generate the conditional risk 122. For example, processing device 104 may check the health data 116 for whether 'x' percent of failed clients have the same version number and less than 'y' number of nodes. If yes, processing device 104 may generate conditional risk 122 with that software version number and attribute of less than 'y' number of nodes. Processing device 104 may refer to many such conditions with various different attributes to identify and extract incompatibilities between the attributes and software versions which is hidden in the health data from all of the clients.

In some examples, determining the conditional risk includes generating the conditional risk in response to the health status of the plurality of clients satisfying an error threshold. For example, processing device 104 may determine that 5% of clients with attribute Y and software version '1.1.3' have an error condition. No conditional risk is generated. Processing device may, however, generate a conditional risk in response to identifying that 80% of clients with attribute X and software version '1.1.3' have an error condition. In some examples, the error threshold may be an error rate (e.g., a percentage) or a number of errors (e.g., greater than 1000 errors), or both.

Processing device 104 may store conditional risk 122 in memory 108. The conditional risk may be stored with others in a data structure such as a database. In some examples, processing device 104 may store conditional risk 122 and other conditional risks (also generated from health data from clients) in memory 108 as a graph. The graph may comprise a node for each software version, and edges between nodes that represent a valid path for transitioning from one version of the software to another version of the software. An edge on the graph may be associated with a conditional risk, if identified.

Memory 108 may include a computer-readable storage medium which may be volatile or non-volatile. In some examples, memory 108 may be managed as a database or by a data server that may be integral to or separate from computing device 102.

Attributes 120 may include a variety of static or dynamic attributes of a client. They may be hardware related (e.g., a CPU architecture, number of CPU cores, manufacturer model numbers, number of nodes that the client is hosted on, etc.), software related (e.g., software drivers installed, operating system, network drivers, etc.), or a combination of hardware and software. The attributes may include a platform provider (e.g., a cloud provider such as AWS, Azure, etc.) or a version of the platform provider that the client is hosted on. Attributes may vary from one client to another. In some examples, the one or more attributes may include a number of nodes or a node ID of the clients 112. For example, clients 112 may be distributed over a plurality of nodes. Clients with less than a threshold number of nodes may be more vulnerable to some software versions. Further, attributes may describe client settings for a cloud platform.

In some examples, the one or more attributes 120 may include a dynamic attribute of the client. For dynamic attributes may include a particular live configuration of a client, a runtime state of the client, one or more invalid DNS entries on the client, a client behavior, a CPU state, a memory state, a network throughput, or other client attribute that may change from one moment to another. In some examples, the dynamic attributes may include a use of the client (e.g., when it performs certain tasks, what tasks it performs, etc.).

Figure 2:
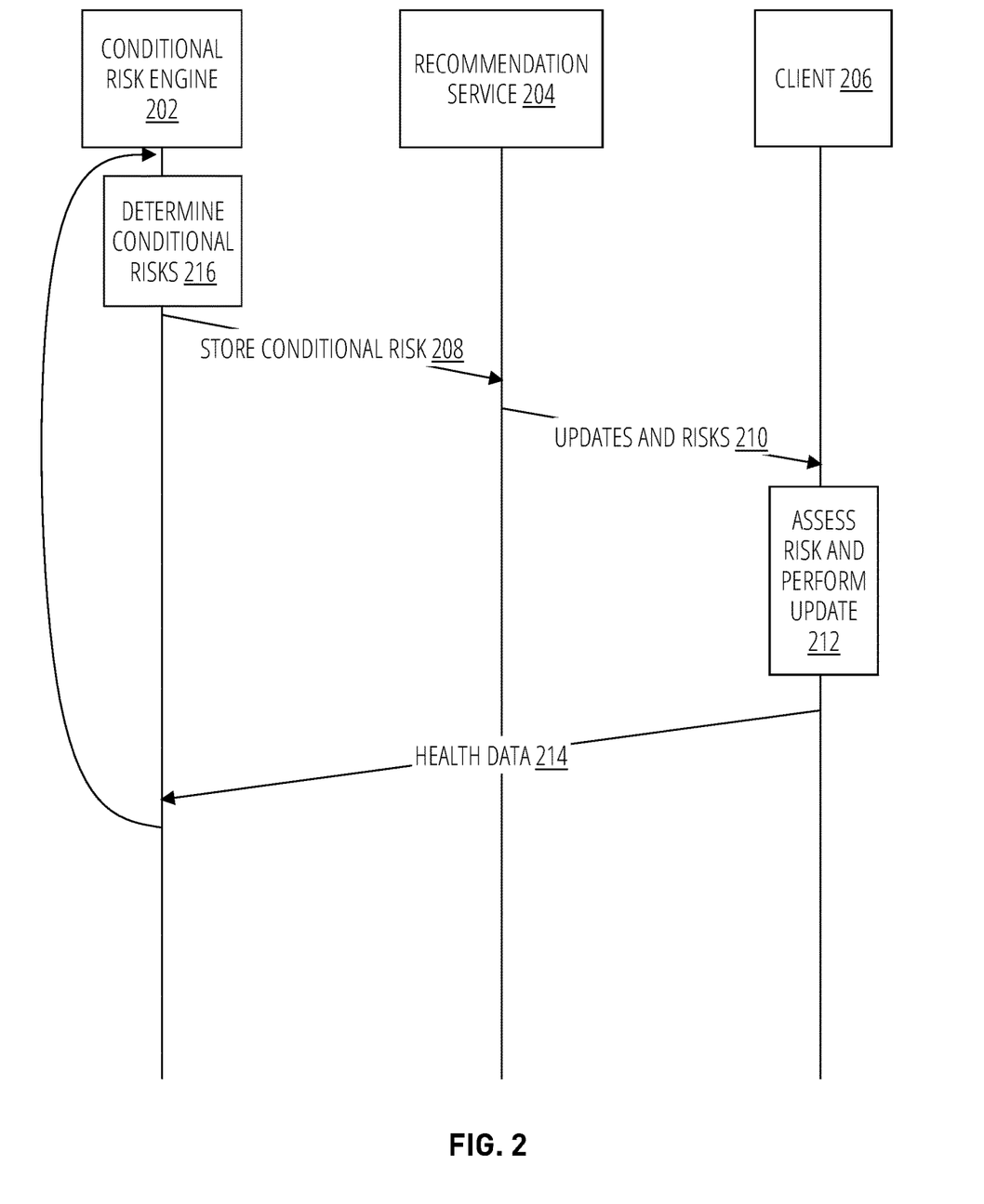
FIG. 2 shows a sequence diagram of an example workflow for generating and providing conditional risks for a software update, in accordance with some embodiments.

FIG. 2 shows a sequence diagram of an example workflow for generating and providing conditional risks for a software update, in accordance with some embodiments. A conditional risk engine 202 may obtain health data from one or more clients 206 through operation 214. For example, each client 206 may transmit the health data to the conditional risk engine 202 over a network. The health data may include attributes of the client, its current software version, and its health status. In some examples, the health data may include when the client upgraded to its current software version, and from what software version it upgraded from.

At operation 216, conditional risk engine 202 may generate conditional risks in view of the health data that is obtained from client 206. As described, conditional risk engine 202 may process the health data (e.g., using conditional logic, a machine learning algorithm, or other technique) and determine correlations between attributes of the client and the software version for clients that exhibit negative health. For such correlations, if an error threshold is satisfied, the conditional risk engine 202 may generate the conditional risk with the attribute (or set of attributes) for that software version.

At operation 208, the conditional risk engine 202 may store the conditional risk (or risks) in memory. For example, the conditional risk engine 202 may store the conditional risks in memory which may be managed by or accessible to a recommendation service 204. Although shown separately in this illustration, conditional risk engine 202 may, in some examples, be integral to recommendation service 204.

At operation 210, a client 206 may obtain which software versions are available for it, and any conditional risk that is associated with that software version. For example, the client 206 may poll the recommendation service 204 to provide available software updates in view of the current software version running on client 206. The client 206 may communicate to recommendation service 204 that client 206 is running software version '1.0.1'. Recommendation service 204 may provide the client 206 with available software versions to update from the current version ('1.0.1') of client 206, along with the conditional risk (e.g., CPU architecture A) if such conditional risk has been established at operation 216. In other examples, recommendation service 204 may simply provide all available software versions for client 206 without taking the client's current version.

At block 212, the client may evaluate or re-evaluate the software updates that are available for its current software version, in view of the associated conditional risks, to determine which conditional risks are relevant to the client 206. For example, the client may decide to pass on a software upgrade version in view of a conditional risk, or ignore the risk and perform the software upgrade. The client 206 may use automatic update logic (e.g., if update exists and no conditional risks are present, install update) or involve an administrator, or both. Further, the client 206 may automatically generate and transmit health data to the conditional risk engine 202 at operation 214, as described. The health data may be transmitted periodically, or in response to performing a software upgrade, or both.

Figure 3:
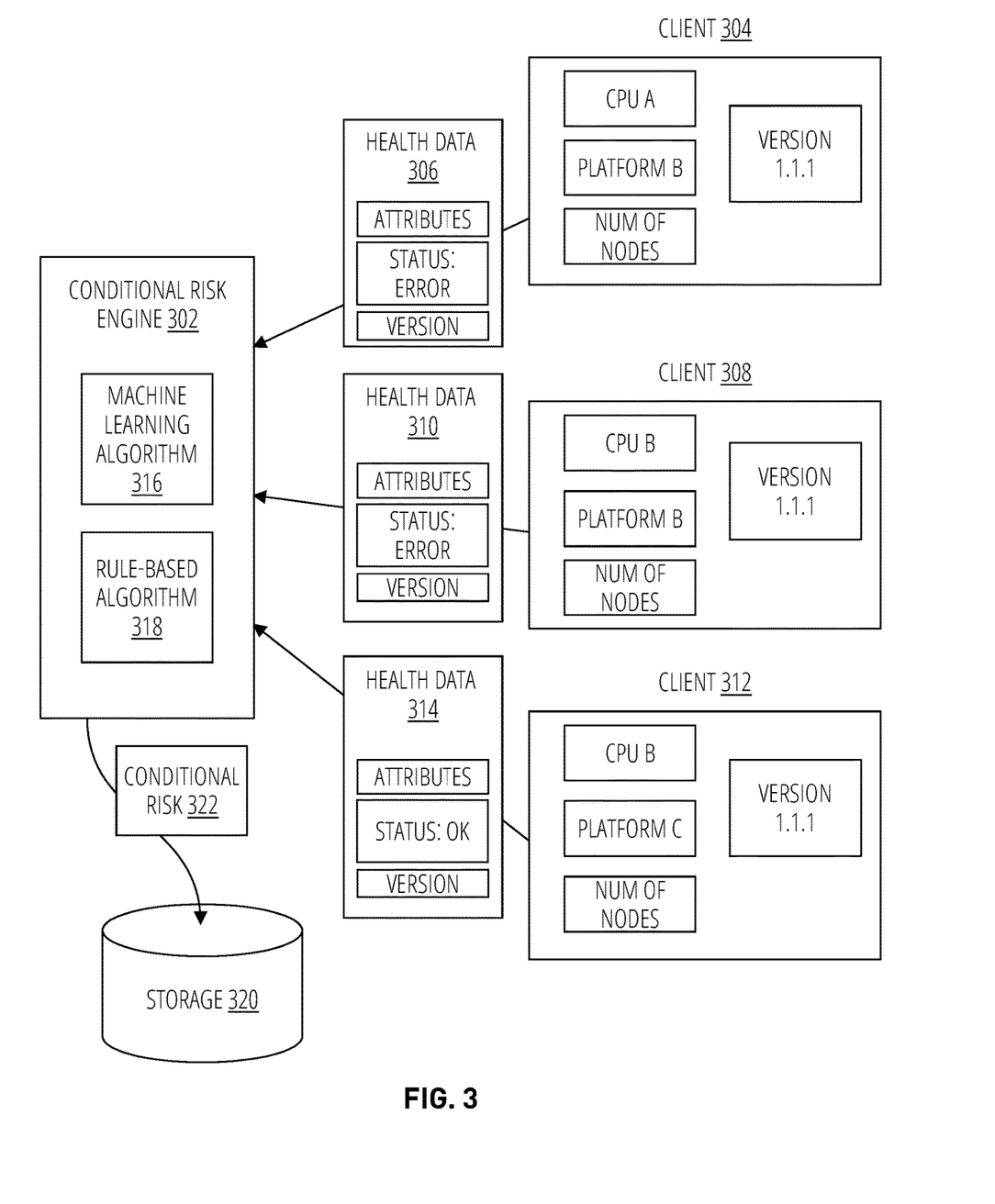
FIG. 3 shows a block diagram of conditional risk generation from client health data, in accordance with some embodiments.

FIG. 3 shows a block diagram of conditional risk generation from client health data, in accordance with some embodiments.

Conditional risk engine 302 may obtain health data such as health data 306, 310, and 314, from a plurality of clients such as clients 304, 308, and 312. Each client may have its own respective set of attributes. For example, client 304 may have a CPU architecture A, be hosted on a platform B, and have current software version '1.1.1'. Similarly, client 308 may have a CPU architecture B, be hosted on a platform B, and have a current software version '1.1.1'. Similarly, client 312 may have a CPU architecture B, be hosted on a platform C, and have a current software version '1.1.1'. Some of the attributes among clients may be common, while others may be different.

Each of the clients may send respective health data (e.g., health data 306, 310, and 314) as messages to conditional risk engine 302 that includes the attributes of each client, the client's version number, and a health status. The health status may indicate whether or not the client is under an error state which may include degraded performance, degraded speed, reduced capabilities, unavailable resources, unexpected or undesirable behavior, a warning, or other error state.

Conditional risk engine 302 may generate conditional risk 322 in view of the health data from the clients. For example, conditional risk engine 302 may scan health data 306, 310, and 314 and note that both client 304 and client 308 have an error health status. Conditional risk engine 302 may identify that both clients are operating platform B. As such, conditional risk engine 302 may identify platform B as a conditional risk for version '1.1.1', in response to the identified commonality (e.g., platform B) between the clients under error. Health data from clients may be aggregated and considered as a whole to identify conditional risks.

Conditional risk engine 302 may include a machine learning algorithm 316, a rule-based algorithm 318, or both, that may be applied to the health data to identify correlations between version numbers and one or more attributes that may be incompatible with a software version.

Conditional risk engine 302 may apply machine learning algorithm 316 to the health data to identify correlations between one or more attributes and a given software version to identify possible incompatibilities. In response to identifying such correlations between one or more of the attributes and the software version, the conditional risk engine 302 may generate the conditional risk 322 with the attribute (or set of attributes) and the software version.

In some examples, conditional risk engine 302 may determine the conditional risk 322 by comparing the health data against one or more conditions (e.g., rules) and, in response to the one or more conditions being present in the health data, generate the conditional risk. For example, conditional risk engine 302 may check the aggregated health data from each of the clients, to determine if 'x' percent of failed clients with the same version number are running on the same platform and have less than 'y' number of nodes. If the condition is satisfied, then conditional risk 322 may be generated with the noted platform and less than 'y' number of nodes.

Conditional risk engine 302 may also use information from clients that indicate a healthy status, to further confirm the correlation between the attribute and the error. For example, conditional risk engine 302 may note that client 312 has version '1.1.1' and a non-error health status with platform C. Conditional risk engine 302 may interpret this data point as further evidence that platform B may be a cause of incompatibility with version '1.1.1'.

Conditional risk engine 302 may store conditional risk 322 in storage 320 in computer readable memory. The storage 320 may include a database. Storage 320 may be accessible to clients 304, 308, 312, or other clients not shown. In some aspects, the storage 320 may be accessible through a recommendation service such as recommendation service 204.

It should be understood that FIG. 3 shows a simplified example, however, in some examples, conditional risk engine 302 may obtain health data from a more numerous amount of clients. Further, a single client may provide a more numerous amount of attributes and a more detailed health status (e.g., including a variety of different health statuses). Further, health data may be repeatedly obtained from the same client over a period of time, and that information may change from one time to another.

Further, as described, machine learning algorithm 316 or rule-based algorithm 318 may identify a combination of attributes (e.g., a fingerprint) that are incompatible to a given version number. For example, conditional risk engine 302 may determine that clients running on platform B with less than 'Y' number of nodes may be incompatible with version 1.1.1, but clients on platform B with 'Y' nodes or greater are compatible. Thus, the conditional risk engine 302 may process health data to identify a single attribute, a combination of attributes, or both, as being incompatible with a given software version.

Figure 4:
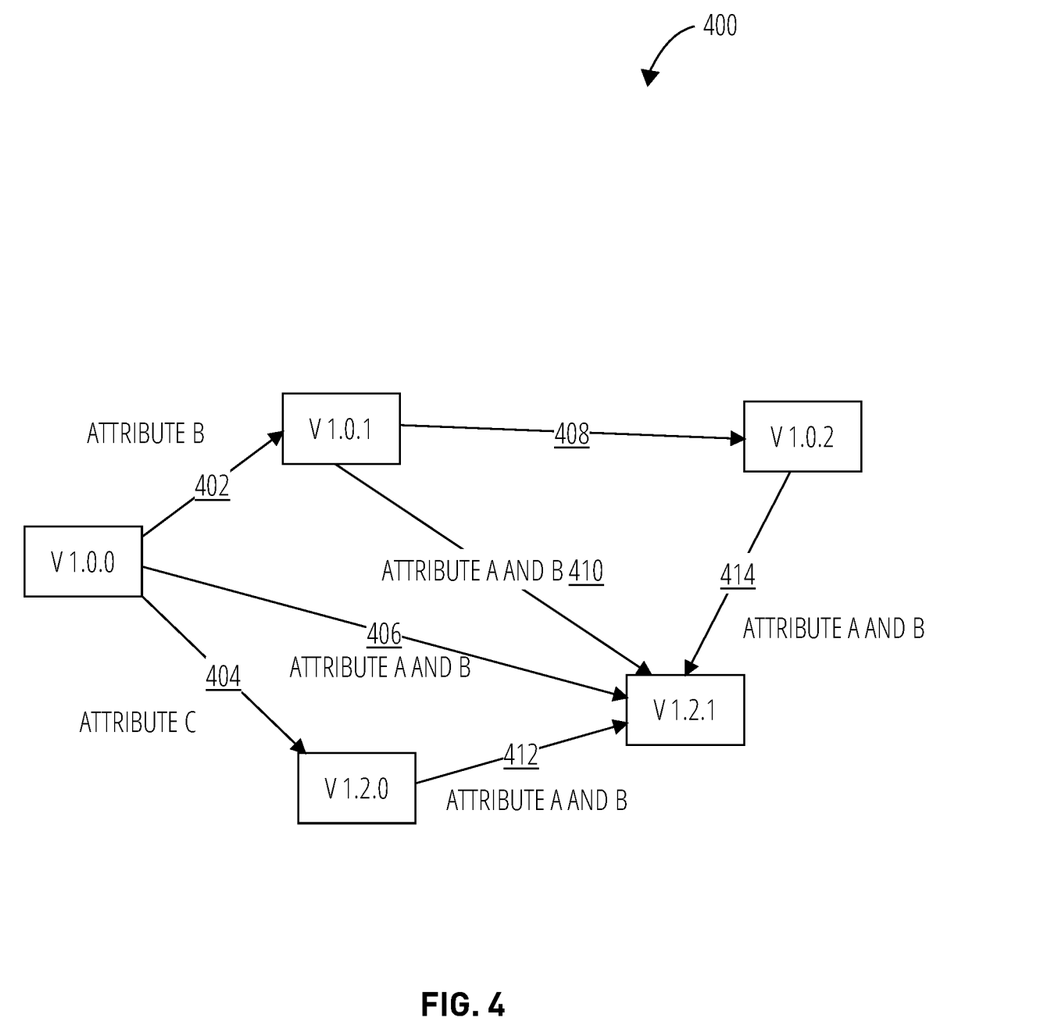
FIG. 4 shows an example of a conditional risk graph, in accordance with some embodiments.

FIG. 4 shows an example of a conditional risk graph, in accordance with some embodiments. Processing logic of a conditional risk engine or a recommendation service, as described in other sections, may identify and store conditional risks in view of health data from clients. Processing logic may store and manage the identified conditional risks as a graph to provide recommended software upgrade paths with the identified risks (if any). A graph may be stored in memory as a data structure.

In some examples, the graph 400 includes a graph with nodes and edges. Each node may represent a software version, and edges may connect a first node to one or more second nodes, to indicate that a client may update from a first software version (represented by the first node) to one or more second software versions (represented by the one or more second nodes). Each node or edge may be associated with one or more attributes to indicate a conditional risk, if such a conditional risk exists.

A conditional risk may include attributes that are incompatible with a given software version. Edges going into a given software version may include conditional risks associated with that software version, such as an attribute or set of attributes that are identified as being incompatible with the software version.

For example, a node may represent version 1.0.0. An edge 402 may join version 1.0.0 to version 1.0.1, thereby indicating that version 1.0.1 is an available software update for version 1.0.0. Further, a conditional risk (e.g., attribute B) may be identified and associated with version 1.0.1. Thus, the conditional risk may be associated with edge 402, that warns that this update (to version 1.0.1) may cause problems to a client, if attribute B pertains to the client. As such, a client with version 1.0.0 may decline updating to version 1.0.1 if they have attribute 'B'.

Further, edge 404 may connect version 1.0.0 to version 1.2.0, indicating that version 1.2.0 is also available as an update to version 1.0.0. A conditional risk (e.g., attribute C) may be associated with edge 404 that recommends that a client perform this update, unless it has attribute C.

Further, edge 406 may connect to version 1.0.0 to version 1.2.1, indicating a third available software update. A conditional risk may be identified for version 1.2.1, which indicates incompatibility with the combination of attribute A and attribute B. As such, each of the edges 406, 410, 412, and 414 that connect to version 1.2.1 may include this conditional risk.

In some examples, however, conditional risks may be determined as transition-based (e.g., from one software version to another). For example, processing logic may identify, from health data, that clients that transitioned from version 1.0.1 with attribute A and B do not exhibit negative health status, while the other clients with version 1.0.1 do exhibit negative health status. In such an example, the processing logic associates edges 406, 412, and 414 with a conditional risk, but edge 410 is not associated with a conditional risk.

Further, some edges may not have any conditional risks. For example, processing logic may not identify any conditional risks with version 1.0.2. As such, edge 408 may not be associated with a conditional risk.

Conditional risks and graph 400 may be updated over time to reflect updated information (e.g., new health data packets from clients). For example, after more health data is received from clients, processing logic may identify and add additional conditional risks such as attribute D at edge 402. Similarly, processing logic may determine, based on additional data, that the error threshold of the conditional risk of attribute C at edge 404 is no longer satisfied and remove this conditional risk.

Figure 5:
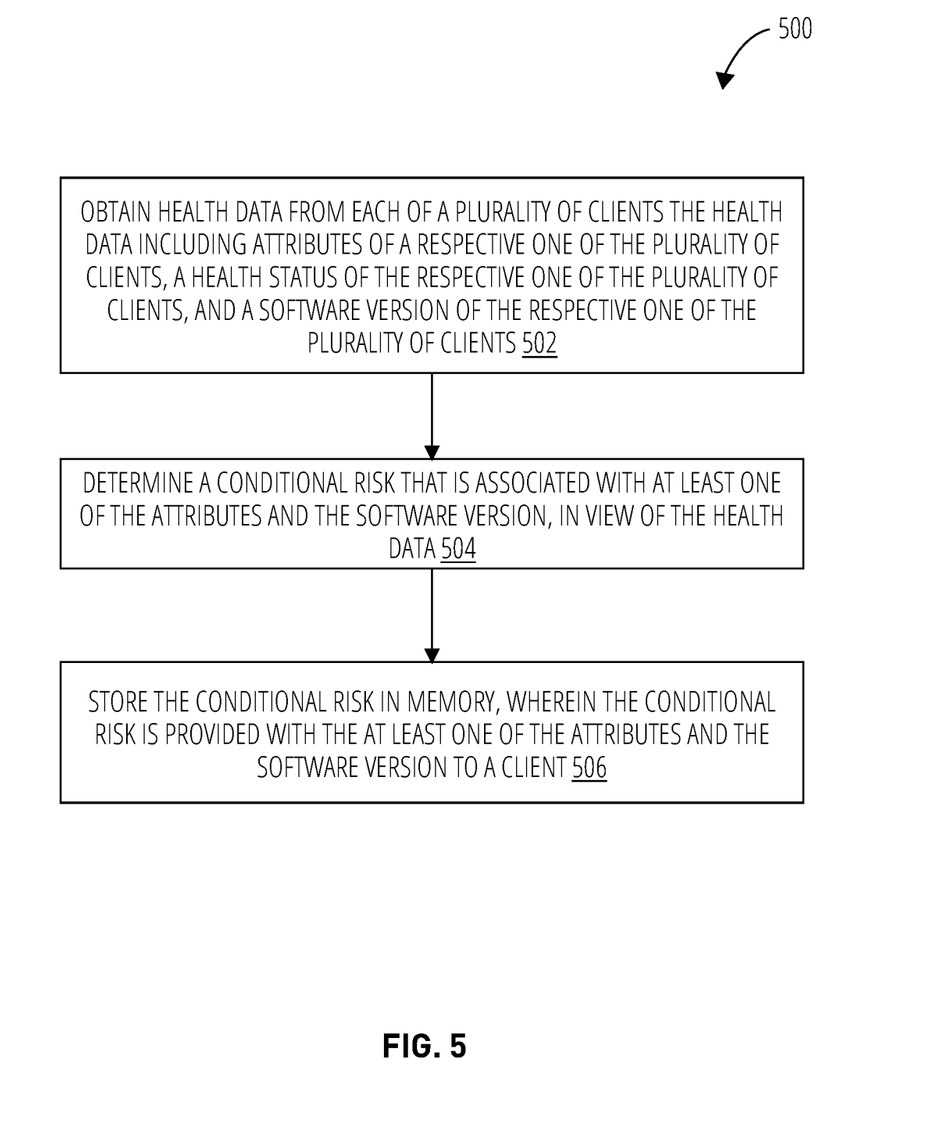
FIG. 5 illustrates an example method for generating a conditional risk for a software version, in accordance with some embodiments.

FIG. 5 illustrates an example method for generating a conditional risk for a software version, in accordance with some embodiments. The method may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

With reference to FIG. 5, method 500 illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in method 500 may be performed in an order different than presented, and that not all of the blocks in the method may be performed.

At block 502, processing logic may obtain health data from each of a plurality of clients, the health data including attributes of a respective one of the plurality of clients, a health status of the respective one of the plurality of clients, and a software version of the respective one of the plurality of clients. Health data may be transmitted and received over a network using a network communication protocol. The attributes, software version, and health status of each client may vary considerably from one client to another. Further, the health data from the same client may vary over time.

At block 504, processing logic may determine a conditional risk that is associated with at least one of the attributes and the software version, in view of the health data. The conditional risk may indicate an incompatibility between a software version and an attribute or a combination of attributes. In some aspects, the conditional risk may be identified as transition-based. For example, the incompatibility may be between a transition from software version A to B, and an attribute or combination of attributes.

At block 506, processing logic store the conditional risk in memory, wherein the conditional risk is provided to a client with the at least one of the attributes and the software version. The conditional risk may be stored with other conditional risks identified by processing logic. The conditional risk may be stored as part of a graph (e.g., associated with an edge, node, or both). The conditional risk or risks may be made accessible to clients through a service, application programming interface (API), or through a computer network. In some examples, processing logic may propose the conditional risk to a human. In response to input from the human that approves the conditional risk, processing logic may store the conditional risk in memory.

In some examples, processing logic may extend to operations performed on the client. For example, processing logic on the client may automatically generate health data by gathering attributes of the client, obtaining possible fault information or other health status information (e.g., CPU usage, memory usage, throughput, system state, etc.), the current software version of the client, the previous software version of the client, when the last upgrade occurred, etc. The processing logic on the clients may automatically send the health data to a conditional risk engine to determine the conditional risks. In some aspects, client side processing logic may be performed by an agent that resides on the client.

Figure 6:
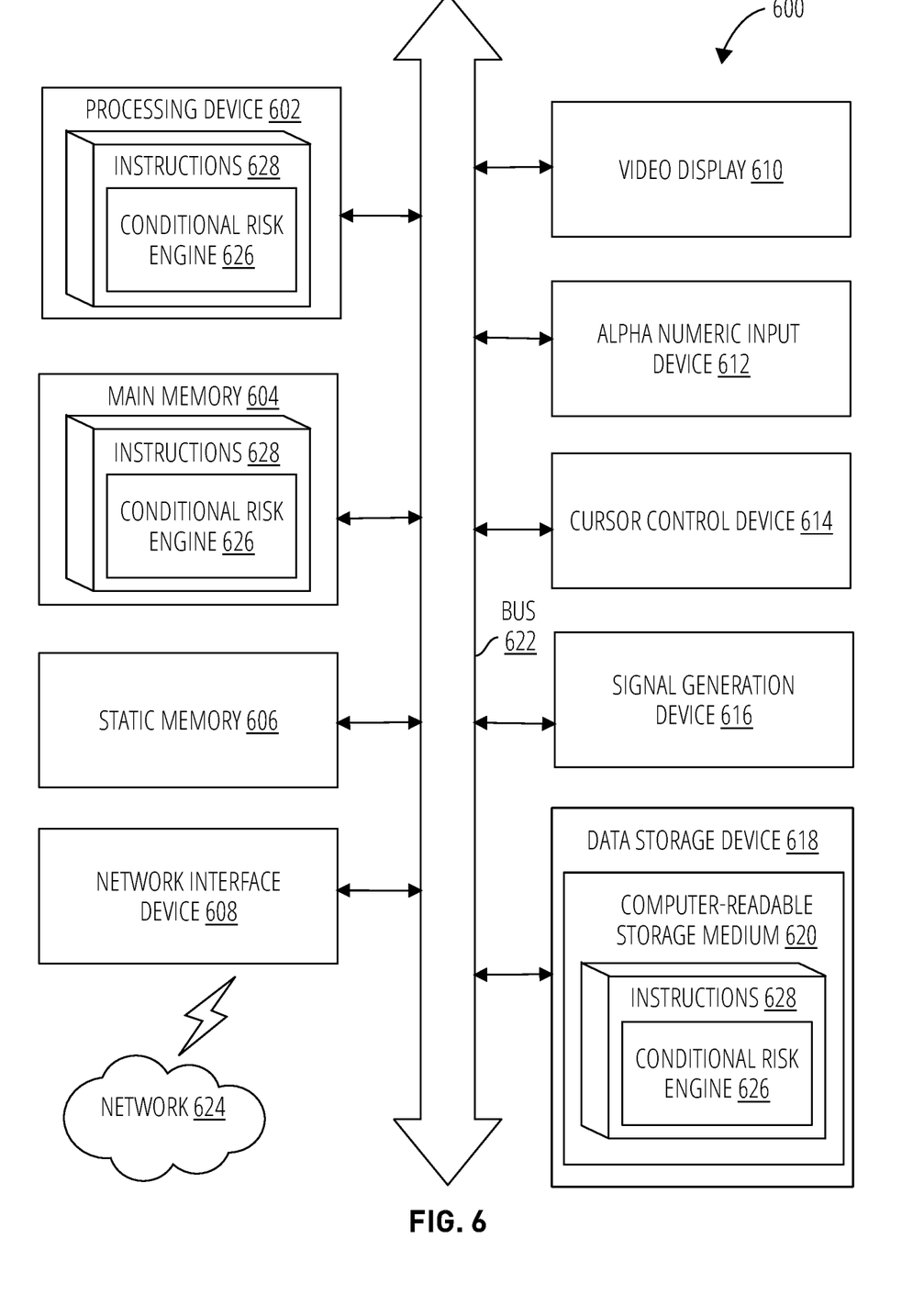
FIG. 6 is a block diagram of an example computing device that may perform one or more of the operations described herein, in accordance with some embodiments.

FIG. 6 is a block diagram of an example computing device 600 that may perform one or more of the operations described herein, in accordance with some embodiments. For example, the computing device 600 may generate conditional risks based on health data of clients, which may be provided to one or more clients to consider whether or not to update to a given software version.

Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device 602 (e.g., a general purpose processor, a PLD, etc.), a main memory 604 (e.g., synchronous dynamic random access memory (DRAM), read-only memory (ROM)), a static memory 606 (e.g., flash memory and a data storage device 618), which may communicate with each other via a bus 622.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 624. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 620 on which may be stored one or more sets of instructions 628 that may include instructions for a processing device (e.g., processing device 104), for carrying out the operations described herein, in accordance with one or more aspects of the present disclosure. Instructions 628 may also reside, completely or at least partially, within main memory 604 and/or within processing device 602 during execution thereof by computing device 600, main memory 604 and processing device 602 also constituting computer-readable media. The instructions 628 may further be transmitted or received over a network 624 via network interface device 608. The instructions 628 may contain instructions of a conditional risk engine 626 that, when executed, perform the operations and steps discussed herein.

While computer-readable storage medium 620 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "sending", "storing", "obtaining", "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component may be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 110, sixth paragraph, for that unit/circuit/component. Additionally, "configured to" or "configurable to" may include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   obtaining health data from each of a plurality of clients, the health data including attributes of a respective one of the plurality of clients, a health status of the respective one of the plurality of clients, and a software version of the respective one of the plurality of clients;
   determining, by a processing device, a conditional risk that is associated with at least one of the attributes that is detected to have an adverse reaction to the software version, in view of the health data; and
   storing the conditional risk in memory, wherein the conditional risk that is associated with the at least one of the attributes that is detected to have the adverse reaction to the software version, the at least one of the attributes, and the software version are transmitted to a client for the client to determine whether to upgrade to the software version.

2. The method of claim 1, wherein the conditional risk is associated with a combination of the attributes.

3. The method of claim 1, wherein determining the conditional risk includes applying a machine learning algorithm to the health data to generate the conditional risk, in response to correlations between one or more of the attributes and the software version.

4. The method of claim 1, wherein determining the conditional risk includes comparing the health data against one or more conditions and, in response to the one or more conditions being present in the health data, generating the conditional risk.

5. The method of claim 1, wherein determining the conditional risk includes generating the conditional risk, in response to the health status of the plurality of clients satisfying an error threshold.

6. The method of claim 1, wherein the attributes include at least one of: a number of nodes of the client, a platform provider, or a CPU architecture of the client.

7. The method of claim 1, wherein the attributes include a dynamic attribute of the client.

8. The method of claim 1, wherein storing the conditional risk in memory includes storing the conditional risk as a graph.

9. A system comprising:
   a memory; and
   a processing device operatively coupled to the memory, the processing device to:
   obtain health data from each of a plurality of clients, the health data including attributes of a respective one of the plurality of clients, a health status of the respective one of the plurality of clients, and a software version of the respective one of the plurality of clients;
   determine, by the processing device, a conditional risk that is associated with at least one of the attributes that is detected to have an adverse reaction to the software version, in view of the health data; and
   store the conditional risk in memory, wherein the conditional risk that is associated with the at least one of the attributes that is detected to have the adverse reaction to the software version, the at least one of the attributes, and the software version are transmitted to a client for the client to determine whether to upgrade to the software version.

10. The system of claim 9, wherein the conditional risk is associated with a combination of the attributes.

11. The system of claim 9, wherein to determine the conditional risk includes to apply a machine learning algorithm to the health data to generate the conditional risk, in response to correlations between one or more of the attributes and the software version.

12. The system of claim 9, wherein to determine the conditional risk includes to compare the health data against one or more conditions and, in response to the one or more conditions being present in the health data, to generate the conditional risk.

13. The system of claim 9, wherein to determine the conditional risk includes to generate the conditional risk, in response to the health status of the plurality of clients satisfying an error threshold.

14. The system of claim 9, wherein the attributes include at least one of: a number of nodes of the client, a platform provider, or a CPU architecture of the client.

15. A non-transitory computer-readable storage medium including instructions that, when executed by a processing device, cause the processing device to:
    obtain health data from each of a plurality of clients, the health data including attributes of a respective one of the plurality of clients, a health status of the respective one of the plurality of clients, and a software version of the respective one of the plurality of clients;
    determine, by the processing device, a conditional risk that is associated with at least one of the attributes that is detected to have an adverse reaction to the software version, in view of the health data; and
    store the conditional risk in memory, wherein the conditional risk that is associated with the at least one of the attributes that is detected to have the adverse reaction to the software version, the at least one of the attributes, and the software version are transmitted to a client for the client to determine whether to upgrade to the software version.

16. The non-transitory computer-readable storage medium of claim 15, wherein the conditional risk is associated with a combination of the attributes.

17. The non-transitory computer-readable storage medium of claim 15, wherein to determine the conditional risk includes to apply a machine learning algorithm to the health data to generate the conditional risk, in response to correlations between one or more of the attributes and the software version.

18. The non-transitory computer-readable storage medium of claim 15, wherein to determine the conditional risk includes to compare the health data against one or more conditions and, in response to the one or more conditions being present in the health data, to generate the conditional risk.

19. The non-transitory computer-readable storage medium of claim 15, wherein to determine the conditional risk includes to generate the conditional risk, in response to the health status of the plurality of clients satisfying an error threshold.

20. The non-transitory computer-readable storage medium of claim 15, wherein the attributes include at least one of: a number of nodes of the client, a platform provider, or a CPU architecture of the client.

* * * * *